(12) United States Patent
Shin et al.

(10) Patent No.: US 11,658,299 B2
(45) Date of Patent: May 23, 2023

(54) LITHIUM SECONDARY BATTERY

(71) Applicant: LG Chem, Ltd., Seoul (KR)

(72) Inventors: Won Kyung Shin, Daejeon (KR); Kyoung Ho Ahn, Daejeon (KR); Chul Haeng Lee, Daejeon (KR); Jeong Woo Oh, Daejeon (KR); Min Jung Kim, Daejeon (KR)

(73) Assignee: LG Energy Solution, Ltd.

( * ) Notice: Subject to any disclaimer, the term of this patent is extended or adjusted under 35 U.S.C. 154(b) by 269 days.

(21) Appl. No.: 16/956,263

(22) PCT Filed: May 10, 2019

(86) PCT No.: PCT/KR2019/005632
§ 371 (c)(1),
(2) Date: Jun. 19, 2020

(87) PCT Pub. No.: WO2019/216695
PCT Pub. Date: Nov. 14, 2019

(65) Prior Publication Data
US 2020/0321615 A1    Oct. 8, 2020

(30) Foreign Application Priority Data

May 11, 2018   (KR) .................. 10-2018-0054549

(51) Int. Cl.
| | | |
|---|---|---|
| *H01M 4/525* | (2010.01) | |
| *H01M 4/485* | (2010.01) | |
| *H01M 4/505* | (2010.01) | |
| *H01M 10/0525* | (2010.01) | |
| *H01M 10/0567* | (2010.01) | |
| *H01M 10/0568* | (2010.01) | |
| *H01M 10/0569* | (2010.01) | |
| *H01M 4/36* | (2006.01) | |
| *H01M 4/587* | (2010.01) | |
| *H01M 4/38* | (2006.01) | |
| *H01M 4/48* | (2010.01) | |
| *H01M 4/58* | (2010.01) | |
| *H01M 4/02* | (2006.01) | |

(52) U.S. Cl.
CPC ........... *H01M 4/525* (2013.01); *H01M 4/364* (2013.01); *H01M 4/386* (2013.01); *H01M 4/483* (2013.01); *H01M 4/485* (2013.01); *H01M 4/505* (2013.01); *H01M 4/58* (2013.01); *H01M 4/587* (2013.01); *H01M 10/0525* (2013.01); *H01M 10/0567* (2013.01); *H01M 10/0568* (2013.01); *H01M 10/0569* (2013.01); *H01M 2004/027* (2013.01); *H01M 2004/028* (2013.01); *H01M 2300/0028* (2013.01)

(58) Field of Classification Search
None
See application file for complete search history.

(56) References Cited

U.S. PATENT DOCUMENTS

| | | |
|---|---|---|
| 2015/0380770 A1 | 12/2015 | Min |
| 2016/0218390 A1 | 7/2016 | Yamada et al. |
| 2016/0329600 A1 | 11/2016 | Lee et al. |
| 2017/0237122 A1 | 8/2017 | Lee et al. |
| 2018/0006294 A1 | 1/2018 | Lee et al. |
| 2018/0102570 A1 | 4/2018 | Koh et al. |
| 2018/0138547 A1 | 5/2018 | Kim et al. |
| 2019/0190019 A1 | 6/2019 | Lee et al. |

FOREIGN PATENT DOCUMENTS

| | | |
|---|---|---|
| JP | 2011082033 A | 4/2011 |
| JP | 2015230816 A | 12/2015 |
| JP | 2016207313 A | 12/2016 |
| JP | 2017021949 A | 1/2017 |
| KR | 20150050382 A | 5/2015 |
| KR | 20150050974 A | 5/2015 |
| KR | 20160001783 A | 1/2016 |
| KR | 20160036808 A | 4/2016 |
| KR | 20160060716 A | 5/2016 |
| KR | 20170038737 A | 4/2017 |
| KR | 20170069915 A | 6/2017 |
| KR | 20170096423 A | 8/2017 |
| KR | 20170110995 A | 10/2017 |
| KR | 20170121192 A | 11/2017 |
| KR | 20180023732 A | 3/2018 |
| KR | 20180057301 A | 5/2018 |

OTHER PUBLICATIONS

International Search Report for PCT/KR2019/005632 dated Aug. 20, 2019; 2 pages.
Extended European Search Report for Application No. 19800415.2 dated Mar. 30, 2021, pp. 1-5.

*Primary Examiner* — Laura Weiner
(74) *Attorney, Agent, or Firm* — Lerner David LLP

(57) ABSTRACT

A lithium secondary battery is disclosed herein. In some embodiments, a lithium battery includes a positive electrode having a lithium-nickel-cobalt-manganese-based electrode active material wherein nickel has a content of 80 mol % or greater, relative to the other transition metals, a negative electrode including a silicon-based negative electrode active material, a separator, and a non-aqueous electrolyte solution including a non-aqueous organic solvent and a lithium salt, the lithium salt being contained in a concentration of 1.8 M to 5 M, and wherein the lithium salt includes $LiPF_6$ and a lithium bis(fluorosulfonyl)imide.

6 Claims, 2 Drawing Sheets

LITHIUM SECONDARY BATTERY

CROSS-REFERENCE TO RELATED APPLICATION(S)

The present application is a national phase entry under 35 U.S.C. § 371 of International Application No. PCT/KR2019/005632, filed on May 10, 2019, which claims priority from Korean Patent Application No. 10-2018-0054549, filed on May 11, 2018, the entire contents of which are incorporated by reference herein.

TECHNICAL FIELD

The present invention relates to a lithium secondary battery, and more specifically, to a lithium secondary battery which has high capacity characteristics, and excellent lifetime characteristics, electrochemical characteristics, and stability.

BACKGROUND ART

With growing interests in new renewable energy which can replace nuclear power and fossil fuels due to recent environmental issues, there is a sharply increasing demand for secondary batteries, among new renewable energies, having semi-permanent lifetime characteristics enabling charging and discharging for repeated use.

Among them, lithium secondary batteries are the most spotlighted secondary batteries due to excellent lifetime characteristics and high energy density thereof. As a positive electrode active material, various lithium transition metal oxides such as $LiCoO_2$, $LiNiO_2$, $LiMnO_2$, $LiMn_2O_4$, $LiFePO_4$, $Li(Ni_aCo_bMn_c)O_2$ (where, a, b, and c are atomic fraction of each independent oxide composition elements, $0<a<1$, $0<b<1$, $0<c<1$, and $a+b+c=1$, hereinafter, referred to as a NCM-based lithium oxide) have been developed. Among these metal oxides, a high-Ni-based NCM-based lithium oxide with an increased nickel content to satisfy high capacity characteristics is currently being actively developed. There is an advantage in an aspect of capacity achievement as the nickel content of the NCM-based lithium oxide increases, but there is a problem of deteriorating the battery performance drastically since the structural stability becomes poor, and transition metal components are eluted by the reaction with an electrolyte. Particularly, when the nickel content in the positive electrode active material is 80 mol % or more in a total transition metal, such a problem is conspicuous.

Meanwhile, carbonaceous materials such as graphite have been mainly used as negative electrode active materials for lithium secondary batteries, but technologies in which a silicon-based material is included as a negative electrode active material, are recently being developed. Since the silicon-based material has higher theoretical capacity than a carbon-based material, there is an advantage that high-capacity characteristics may be achieved. However, there are problems in that the silicon-based material has low initial capacity and high initial resistance due to high irreversible capacity. Also, there is a problem in that the battery lifetime is degraded since volume expansion occurs during charge and discharge process.

In addition, when a silicon-based negative electrode active material and a positive electrode active material having a high nickel content are used together, there is a problem in that it is difficult to form a stable film since metal ions eluted from the positive electrode active material hinder the formation of a SEI (solid electrolyte interphase) film on the surface of the negative electrode, thereby accelerating degradation of negative electrode performance.

Therefore, there is a need to develop a lithium secondary battery which has excellent electrochemical characteristics, stability, and lifetime characteristics while achieving high-capacity characteristics.

DISCLOSURE OF THE INVENTION

Technical Problem

To solve the above-described problem, the present invention provides a lithium secondary battery which has excellent electrochemical characteristics, stability, and lifetime characteristics while using active materials having high-capacity characteristics for a positive electrode and a negative electrode.

Technical Solution

In an aspect of the present invention, there is provided a lithium secondary battery comprising: a positive electrode including a lithium nickel cobalt manganese-based positive electrode active material having a nickel content of mol % or greater, based on the total molar amount of transition metals in the positive electrode active material; a negative electrode including a silicon-based negative electrode active material; a separator; and a non-aqueous electrolyte solution, wherein the non-aqueous electrolyte solution includes a non-aqueous organic solvent and a lithium salt, the lithium salt being contained in a concentration of 1.8 M to 5 M, and the lithium salt including $LiPF_6$, and a lithium bis(fluorosulfonyl)imide. Here, $LiPF_6$ and the lithium bis(fluorosulfonyl)imide are preferably included in a weight ratio of 1:9 to 5:5.

The positive electrode active material may be represented by Formula 1 below.

 [Formula 1]

In Formula 1 above, $0 \leq x < 1$, $0.8 \leq a < 1$, $0 < b < 0.2$, $0 < c < 0.2$, $0 \leq d < 0.2$, and M is at least one element selected from the group consisting of W, Cu, Fe, V, Cr, Ti, Zr, Zn, Al, Ta, Y, In, La, Sr, Ga, Sc, Gd, Sm, Ca, Ce, Nb, Mg, B, and Mo.

The silicon-based negative electrode active material may include at least one selected from the group consisting of a metal silicon (Si), a silicon oxide ($SiO_y$), a silicon carbide (SiC), and a silicon alloy (Si alloy).

Meanwhile, the negative electrode may further include a carbon-based negative electrode active material, and in this case, the silicon-based negative electrode active material and the carbon-based negative electrode active material may be included in a weight ratio of 1:99 to 50:50.

Meanwhile, the non-aqueous organic solvent may include at least one selected from the group consisting of a cyclic carbonate-based solvent, a linear carbonate-based solvent, an ester-based solvent, and an ether-based solvent, and preferably, the non-aqueous organic solvent may include the cyclic carbonate-based solvent in 20 vol % or less, based on the total volume of the non-aqueous organic solvent.

Advantageous Effects

The lithium secondary battery of the present invention includes a lithium nickel cobalt manganese-based positive electrode active material wherein among all the transition metals, the nickel has a content of 80 mol % or greater, and a silicon-based negative electrode active material, and thus has excellent characteristics.

In addition, the lithium secondary battery of the present invention includes a lithium salt in a non-aqueous electrolyte at a high concentration of 1.8 M to 5 M, thus improving oxidation stability and heat-generating characteristics of a lithium nickel cobalt manganese-based positive electrode active material having a nickel content of 80 mol % or more, based on the total molar amount of transition metals in the positive electrode active material, and minimizing a negative electrode degradation occurring when a positive electrode active material having a high nickel content and a silicon-based negative electrode active material are used together, thereby making it possible to achieve excellent lifetime characteristics and thermal stability.

Furthermore, the lithium secondary battery of the present invention uses two specific lithium salts so that initial capacity reduction and initial resistance characteristics of the silicon-based negative electrode active material can be minimized.

MODE FOR CARRYING OUT THE INVENTION

Figure 1:
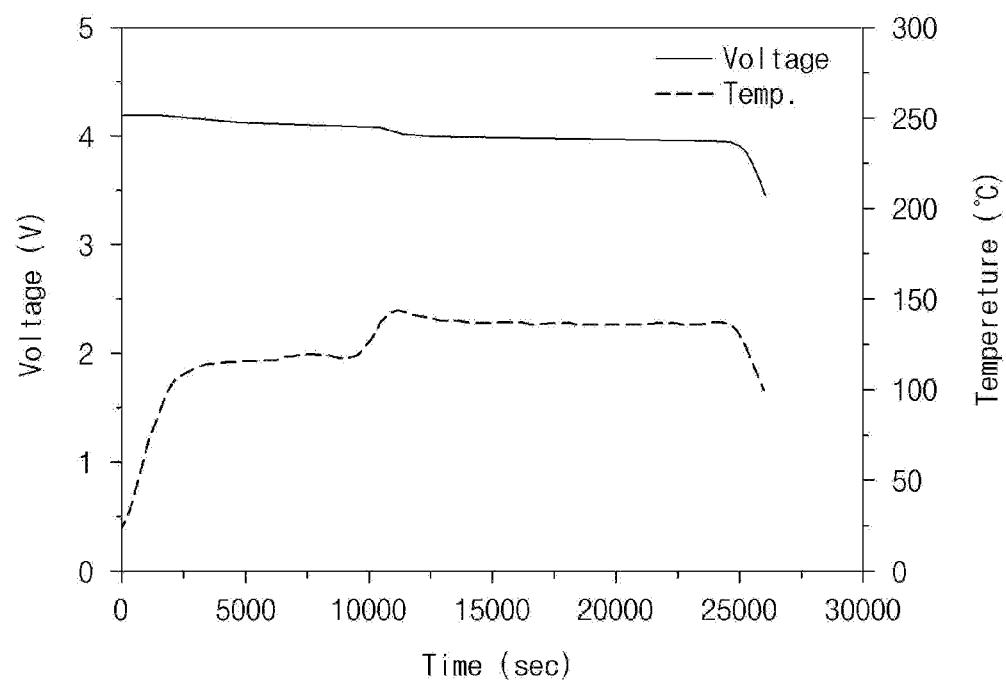
FIG. 1 is a graph showing temperature and voltage changes with time when a lithium secondary battery manufactured according to Example 1 of the present invention was HOT box tested.

Hereinafter, the present invention will be described in more detail.

It will be understood that terms or words used in the description and claims should not be construed as a meaning and concept that accord with the technical sprits of the present invention based on a principle that the inventors may properly define the concepts of terms in order to describe their own invention in best mode.

The terms used herein is for the purpose of describing exemplary embodiments only and is not intended to be limiting of the present invention. The singular expressions include the plural expressions, unless the context clearly means otherwise.

It will be understood that the terms "include", "provided with" or "have" when used in the description, specify the presence of stated features, numerals, steps, elements, or the combination thereof, but do not preclude the presence or addition of one or more other features, numerals, steps, elements, or the combination thereof.

"%" used in the description means weight % unless otherwise indicated.

Specifically, the present invention provides a lithium secondary battery comprising: a positive electrode including a lithium nickel cobalt manganese-based positive electrode active material having a nickel content of 80 mol % or greater, based on the total molar amount of transition metals in the positive electrode active material; a negative electrode including a silicon-based negative electrode active material; a separator; and a non-aqueous electrolyte solution, wherein the non-aqueous electrolyte solution includes a non-aqueous organic solvent and a lithium salt, the lithium salt being contained at a concentration of 1.8 M to 5 M, and the lithium salt including LiPF$_6$ and a lithium bis(fluorosulfonyl)imide.

The positive electrode, the negative electrode, and the separator, which constitute the lithium secondary battery of the present invention may be manufactured by the normal manner and used.

The positive electrode may be manufactured by forming a positive electrode mixture layer on a positive electrode current collector. The positive electrode mixture layer may be formed by coating the positive electrode current collector with positive electrode slurry including a positive electrode active material, a binder, a conductive material, and a solvent, and then drying and rolling the coated positive electrode current collector.

The positive electrode current collector is not particularly limited so long as it has conductivity without causing chemical changes in the battery, and for example, may employ stainless steel, aluminum, nickel, titanium, fired carbon, or aluminum or stainless steel that is surface-treated with carbon, nickel, titanium, silver, or the like.

Here, the positive electrode active material includes a lithium nickel cobalt manganese-based positive electrode active material having a nickel content of 80 mol % or greater, based on the total molar amount of transition metals in the positive electrode active material. Specifically, the positive electrode active material may be represented by Formula 1 below.

$$Li_{1+x}[Ni_aCo_bMn_cM_d]O_2 \qquad \text{[Formula 1]}$$

In Formula 1 above, $0 \leq x < 1$, $0.8 \leq a < 1$, $0 < b < 0.2$, $0 < c < 0.2$, $0 \leq d < 0.2$, and M is at least one element selected from the group consisting of W, Cu, Fe, V, Cr, Ti, Zr, Zn, Al, Ta, Y, In, La, Sr, Ga, Sc, Gd, Sm, Ca, Ce, Nb, Mg, B, and Mo.

As aforementioned, since the lithium nickel cobalt manganese-based positive electrode active material having a high nickel content has high energy density, when using this, high-capacity and high-output characteristics may be achieved. However, in the case of a compound represented by Formula 1 above, which is a high-content nickel (Hi-Ni) oxide having a molar ratio of Ni of 80 mol % or more, during charge and discharge process, a cation mixing phenomenon occurs in which positions of $Li^{+1}$ ions and $Ni^{+2}$ ions are changed in the layered structure of the positive electrode active material. This phenomenon occurs as $Li^{+1}$ ions are similar to $Ni^{+2}$ ions in size. When a nickel atom and a transition metal atom having the d-orbit are coordinate-bonded in a high-temperature environment, the positive electrode active material should have an octahedron structure according to change in oxidation number of Ni included in the positive electrode active material, but forms a distorted octahedron by a heterogeneous reaction in which the energy level order is reversed by external energy supply or the oxidation number changes, resulting in distortion and collapse of the crystal structure of the positive electrode active material. In addition, in a high temperature storage, another side reaction in which a transition metal, especially the nickel metal is eluted from the positive electrode active material due to a side reaction between the positive electrode active material and the electrolyte occurs. When such a side reaction occurs, the whole secondary battery performance is easily degraded due to a structural collapse of the positive electrode active material accompanying with depletion of the electrolyte inside the secondary battery. Also, there arises a problem in that formation of an SEI film on the surface of the negative electrode is suppressed by an eluted nickel metal, thereby accelerating the degradation of the negative electrode.

Hence, the lithium secondary battery of the present invention employs a non-aqueous electrolyte solution containing two specific lithium salts at a high concentration as aforementioned together with a positive electrode active material having a high nickel content, so that a side between the positive electrode and the electrolyte solution, and a metal elution phenomenon are effectively suppressed, thereby alleviating a structural instability of a high capacity electrode.

Reviewing this specifically, as in the present invention, when lithium salts are contained in a non-aqueous electrolyte solution at a high concentration, since an amount of a free solvent (non-solvation solvent) which does not participate in dissociation of a positive ion and a negative ion in the electrolyte solution solvent decreases, an decomposition reaction of the electrolyte solution decreases, and since an amount of a solvent bonded to the lithium ions increases, solubility of a metal ion is lowered and thus an additional elution phenomenon of the metal ions is suppressed.

Accordingly, since a sufficient nickel and transition metal amount for ensuring the capacity of a lithium secondary battery is ensured, an energy density increases, thereby capable of preventing output characteristics from being degraded, and also preventing a negative electrode degradation due to metal elution.

The positive electrode active material may be included in an amount of 80 wt % to 99.5 wt %, and specifically 85 wt % to 95 wt %, based on the total weight of the solid content of positive electrode slurry. If the content of the positive electrode active material is less than 80 wt %, an energy density may be lowered and thus capacity may be lowered.

In addition, the binder which is one of the positive electrode slurry components, is a component that assists in binding between the active material and the conductive material and in binding with the current collector, and is typically included in an amount of 1 to 30 wt %, based on the total weight of the solid content of the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene (PE), polypropylene, an ethylene-propylene-diene terpolymer (EPDM), a sulfonated EPDM, a styrene-butadiene rubber, a fluorine rubber, various copolymers, and the like.

In addition, there is no particular limit to the conductive material which is one of the positive electrode slurry components, so long as it has conductivity without causing chemical changes in the battery. Examples of the conductive material include conductive materials, such as: carbon powder such as carbon black, acetylene black, Ketjen black, channel black, furnace black, lamp black, or thermal black; graphite powder such as natural graphite having highly developed crystal structure, artificial graphite, or graphite; conductive fibers such as carbon fibers or metal fibers; metal powder such as carbon fluoride powder, aluminum powder, or nickel powder; conductive whiskers such as zinc oxide, or potassium titanate; conductive metal oxide such as titanium oxide; and polyphenylene derivatives. Typically, the conductive material is included in an amount of 1 to 30 wt %, based on the total weight of the solid content of the positive electrode slurry.

The conductive material may have an average particle diameter ($D_{50}$) of 10 μm or less, particularly 0.01 μm to 10 μm, and more particularly 0.01 μm to 1 μm. Here, when the average particle diameter of the binder exceeds 10 μm, the dispersibility is poor so that the effect of improvement in conductivity resulted from addition of graphite powder is insignificant. Thus, the binder having an average particle diameter exceeding 10 μm is undesirable.

As the conductive material, commercially available products under the name of, for example, Chevron Chemical Company or Denka black (Denka Singapore Private Limited) which are acetylene black-based products, Gulf Oil Company products, Ketjen black, EC-based (Armak Company products), Vulcan XC-72 (Cabot Company products), and Super P (Timcal Co. products) may also be used.

In addition, the solvent may include an organic solvent such as N-methyl-2-pyrrolidone (NMP), and may be used in an amount satisfying a desirable viscosity when the positive electrode active material, and the binder and the conductive material are selectively included. For example, the solvent may be included such that the concentration of the solid content in slurry, which includes the positive electrode active material, and selectively includes a binder and a conductive material, may be 10 to 60 wt %, and preferably 20 to 50 wt %.

In addition, the negative electrode may be manufactured by forming a negative electrode mixture layer on a negative electrode current collector. The negative electrode mixture layer may be formed by coating the negative electrode current collector with negative electrode slurry including a negative electrode active material, a binder, a conductive material, and a solvent, and then drying and rolling the coated negative electrode current collector.

The negative electrode current collector generally has a thickness of 3 to 500 μm. There is no particular limit to the negative electrode current collector so long as it has a high conductivity without causing chemical changes in the battery. Examples of the conductive material include copper, stainless steel, aluminum, nickel, titanium, fired carbon, copper or stainless steel which is surface-treated with carbon, nickel, titanium, silver, or the like, and aluminum-cadmium alloy, or the like. In addition, as in the positive electrode current collector, the negative electrode current collector may have fine irregularities on the surface thereof to improve the bonding strength of the negative electrode active material, and the negative electrode current collector may be used in various shapes such as a film, a sheet, a foil, a net, a porous body, a foam body, and a non-woven fabric body.

Meanwhile, the negative electrode active material may include a silicon-based negative electrode active material. Specifically, the silicon-based negative electrode active material may include a metal silicon (Si), a silicon oxide ($SiO_y$, where 0<y<2), a silicon carbide (SiC), and a Si—Y alloy (where Y is an element selected from the group consisting of alkali metal, alkaline earth metal, a Group 13 element, a Group 14 element, transition metal, a rare earth element, and a combination thereof, and excludes Si). The element Y may be, for example, selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Also, in addition to the silicon-based negative electrode active material, the negative electrode active material may further include a carbon-based negative electrode active material. Various carbon-based negative electrode active materials available in the art, such as artificial graphite, natural graphite, graphitized carbon fiber, amorphous carbon, may be used as the carbon-based negative electrode active material. Meanwhile, both a low-crystalline carbon and a high-crystalline carbon may be used as the carbon-based negative electrode active material. Representative examples of the low-crystalline carbon may include a soft carbon and a hard carbon, and representative examples of the high crystalline carbon may include irregular, planar, flaky, spherical, or fibrous natural graphite or artificial graphite, Kish graphite, pyrolytic carbon, mesophase pitch based carbon fiber, meso-carbon microbeads, mesophase pitches, and high-temperature sintered carbon such as petroleum or coal tar pitch derived cokes.

Preferably, the negative electrode active material may be a mixture of a silicon-based negative electrode active material and a carbon-based negative electrode active material, and here, the mixing ratio of the silicon-based negative electrode active material to the carbon-based negative electrode active material may be 1:99 to 50:50, and preferably 5:95 to 30:70 at a weight ratio. When the mixing ratio of the silicon-based negative electrode active material to the carbon-based negative electrode active material satisfies the above-mentioned range, excellent cycle performance may be ensured since the volume expansion of the silicon-based negative electrode active material is suppressed, while improving the capacity characteristics.

The negative electrode active material may be included in an amount 80 to 90 wt %, based on a total solid content of the negative electrode slurry.

In addition, the binder which is one of the negative electrode slurry components, is a component that assists in binding between the active material and the conductive material and in binding with the current collector, and is typically included in an amount of 1 to 30 wt %, based on the total weight of the solid content of the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene (PE), polypropylene, an ethylene-propylene-diene terpolymer (EPDM), a sulfonated EPDM, a styrene-butadiene rubber, a fluorine rubber, various copolymers, and the like.

The conductive material is a component for further improving conductivity of the negative electrode active material. There is no particular limit to the conductive material so long as it has a conductivity without causing chemical changes in the battery. Examples of the conductive material include conductive materials, such as: carbon powder such as carbon black, acetylene black, Ketjen black, channel black, furnace black, lamp black, or thermal black; graphite powder such as natural graphite having highly developed crystal structure, artificial graphite, or graphite; conductive fibers such as carbon fibers or metal fibers; metal powder such as carbon fluoride powder, aluminum powder, or nickel powder; conductive whiskers such as zinc oxide, or potassium titanate; conductive metal oxide such as titanium oxide; or polyphenylene derivatives.

The solvent may include an organic solvent, such as water, an NMP, or an alcohol, and may be used in an amount satisfying a desirable viscosity when the negative electrode active material is included, and the binder, the conductive material, etc. are selectively included. For example, the solvent may be included such that the concentration of the solid content in slurry including the negative electrode active material, and selectively including a binder and a conductive material, may be 50 wt % to 75 wt %, and preferably 50 wt % to 65 wt %.

In addition, in the lithium secondary battery according to an embodiment of the present invention, the separator plays a role in blocking an internal short circuit between both electrodes and impregnating the electrolyte, and may be a porous separator conventionally used in the technical field of a secondary battery.

As the separator, for example, a porous polymer film formed from a polyolefin-based polymer, such as an ethylene homopolymer, a propylene homopolymer, an ethylene/butene copolymer, an ethylene/hexene copolymer, and an ethylene/methacrylate copolymer may be used alone or in a laminated form, or a typical porous nonwoven fabric, for example, a non-woven fabric formed of a high-melting-point glass fiber, a polyethylene terephthalate fiber, or the like may be used. However, the separator is not limited thereto.

Alternatively, as the separator, one which is formed by mixing a polymer resin, a filler, and a solvent to prepare a separator composition, then directly coating the top of the electrode with the separator composition, and drying the separator composition to form a separator film, or another one which is formed by casting and drying the separator composition on a support, and then laminating, on the electrode, a separator film peeled off from the support, may be used.

Here, the porous separator may generally have a pore diameter of 0.01 to 50 μm and a porosity of 5% to 95%. Also, the porous separator may generally have a thickness in a range of 5 μm to 300 μm.

In addition, the lithium secondary battery according to an embodiment of the present invention includes a non-aqueous electrolyte solution containing a non-aqueous organic solvent and a lithium salt.

In the present invention, the lithium salt includes $LiPF_6$ and a lithium bis(fluorosulfonyl)imide.

$LiPF_6$ has excellent electrochemical stability and high ionic conductivity.

The lithium bis(fluorosulfonyl)imide may form a stable SEI film on the surface of a silicon-based negative electrode active material, so that the reduction reaction of silicon with the electrolyte solution, and negative electrode expansion may be suppressed. Furthermore, the SEI film formed by the lithium bis(fluorosulfonyl)imide has high stability at a high temperature, thereby obtaining an effect of improving thermal stability of the battery.

Thus, when $LiPF_6$ and the lithium bis(fluorosulfonyl)imide are used together as in the present invention, a secondary battery which has excellent lithium ion conductivity, excellent electrode stability, and excellent thermal stability may be obtained.

Meanwhile, $LiPF_6$ and the lithium bis(fluorosulfonyl)imide may be included in a weight ratio of 1:9 to 5:5, and preferably 2:8 to 5:5. When the mixing ratio of $LiPF_6$ and the lithium bis(fluorosulfonyl)imide satisfies the above-mentioned range, an SEI film may be stably formed on the surface of a negative electrode including a silicon-based negative electrode active material, thereby manufacturing a secondary battery having excellent stability.

Meanwhile, the non-aqueous electrolyte of the present invention includes a lithium salt at a concentration of 1.8 M to 5 M, preferably 2 M to 5 M, and more preferably 2 M to 4 M. The research by the present inventors shows effects that when lithium salts in the non-aqueous electrolyte solution are present at a high concentration in a lithium secondary battery using a positive electrode active material having a high nickel content and a silicon-based negative electrode active material, as aforementioned, oxidation stability, and heat generation characteristics are improved.

Specifically, when the lithium salt concentration in the non-aqueous electrolyte solution is 1.8 M or more, a hopping phenomenon of lithium ions occurs so that mobility of lithium ions is improved, and the free solvent decreases so that a metal ion elution is suppressed. Also, the film resulting from a high concentration of lithium salt prevents volume expansion of silicon generated during charge/discharge process of a lithium secondary battery, so that degradation of performance is suppressed, and a thermal stability of a lithium secondary battery is improved since the film stably exists at a high-temperature. On the other hand, when the concentration of a lithium salt in the non-aqueous electrolyte solution exceeds 5 M, there is a problem in that the lithium salt is not dissociated so that the battery has a difficulty being driven.

Meanwhile, it is preferable to employ at least one selected from the group consisting of a cyclic carbonate-based solvent, a linear carbonate-based solvent, an ester-based solvent, and an ether-based solvent as the non-aqueous organic solvent.

Here, the non-aqueous organic solvent may include the cyclic carbonate-based solvent at 20 vol % or less, preferably 1 to 20 vol %, and more preferably 5 to 15 vol %. When the content of the cyclic carbonate-based solvent exceeds 20 vol %, there is a problem in that the surface tension and the viscosity of the non-aqueous electrolyte solution increase so that wetting characteristics are deteriorated. Also, since the cyclic carbonate has a high metal ion solubility and a high reduction decomposition potential, when the non-aqueous organic solvent contains the cyclic carbonate in an excessive amount, the metal ion elution of a positive electrode active material having a high nickel content may be promoted, and when the cyclic carbonate is used together with a high concentration salt, performance of the battery may be degraded due to forming an excessively thick SEI film on the surface.

A specific example of the cyclic carbonate-based solvent is any one or a mixture including at least two kinds selected from the group consisting of an ethylene carbonate (EC), a propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), but is not limited thereto.

In addition, a specific example of the linear carbonate-based solvent is any one or a mixture including at least two kinds selected from the group consisting of a dimethyl carbonate (DMC), a diethyl carbonate (DEC), a dipropyl carbonate, an ethyl methyl carbonate (EMC), a methyl propyl carbonate and an ethyl propyl carbonate, but is not limited thereto.

A linear ester-based solvent, a cyclic ester-based solvent, or a combination thereof may be used as the ester-based solvent.

A specific example of the linear ester-based solvent is any one or a mixture including at least two kinds selected from the group consisting of a methyl acetate, an ethyl acetate, a propyl acetate, a methyl propionate, an ethyl propionate, a propyl propionate, and a butyl propionate, but is not limited thereto.

In addition, a specific example of the cyclic ester-based solvent is any one or a mixture including at least two kinds selected from the group consisting of γ-butyrolactone, γ-valerolactone, γ-caprolactone, α-valerolactone, and ε-caprolactone, but is not limited thereto.

Meanwhile, a specific example of the ether-based solvent is any one or a mixture including at least two kinds selected from the group consisting of a dimethyl ether, a diethyl ether, a dipropyl ether, a methyl ethyl ether, a methyl propyl ether, and ethyl propyl ether, but is not limited thereto.

Preferably, the non-aqueous electrolyte solution of the present invention may be a mixture solvent including a cyclic carbonate-based solvent and a linear carbonate-based solvent, and here, a mixing ratio of the cyclic carbonate-based solvent to the linear carbonate-based solvent may be 1:99 to 20:80, and preferably 5:95 to 20:80 at a volume ratio.

Meanwhile, in addition to the lithium salt and the organic solvent, the non-aqueous electrolyte solution according to the present invention may further include an additive, as needed.

The additive includes vinylene carbonate (VC), oxalyl difluoroborate (ODFB), vinylethylene carbonate (VEC), succinic anhydride (SA), succinonitrile (SN), 1,3-propane sultone (PS), or a combination thereof. Preferably, the additive includes vinylene carbonate (VC), and most preferably, vinylene carbonate (VC) and propane sultone (PS). When the additive is added to the non-aqueous electrolyte solution to manufacture a secondary battery, the additive may form a stable SEI film together with the lithium salt on a negative electrode, thereby improving the output characteristics, and preventing an oxidation reaction of the electrolyte solution by suppressing decomposition of the surface of a positive electrode. Accordingly, output characteristics of a secondary battery may be effectively improved.

The additive may be included in an amount of 0.1 wt % to 10 wt %, and preferably 0.5 wt % to 3 wt % with respect to the total weight of the non-aqueous electrolyte solution. When the additive is included in an amount of less than 0.1 wt %, the effect of improving the low-temperature output and high-temperature stability characteristics of the secondary battery may be insignificant, and when the content of the additive exceeds 10 wt %, a side reaction in the electrolyte solution may occur excessively. In particular, when the additive is added in an excess amount in the non-aqueous electrolyte solution, the additive may not be decomposed sufficiently at a high temperature and be present as an unreacted material at room temperature, thereby deteriorating the lifetime or resistance characteristics of the secondary battery.

A shape of the lithium secondary battery of the present invention is not particularly limited, but a cylindrical type, a prismatic type, a pouch type, or a coin type may be applied variously depending on the purpose to be performed. The lithium secondary battery according to an embodiment of the present invention may be a pouch type secondary battery.

MODE FOR CARRYING OUT THE INVENTION

Example 1

(Preparation of Non-Aqueous Electrolyte Solution)

A non-aqueous electrolyte solution was prepared by adding 2 g of vinylene carbonate (VC) and 1 g of propane sultone (PS) to 97 g of a non-aqueous organic solvent (a solvent mixture in which ethylene carbonate:dimethyl carbonate were mixed in a volume ratio of 1:9) in which 1.0 M $LiPF_6$ and 1.0 M lithium bis(fluorosulfonyl)imide were dissolved.

(Manufacture of Secondary Battery)

$LiNi_{0.8}Co_{0.1}Mn_{0.1}O_2$ (NCM811) as a positive electrode active material, Super-P as a conductive material, and polyvinylidene fluoride (PVdF) as a binder, were added to N-methyl-2-pyrrolidone (NMP) at a weight ratio of 95:2:3 to prepare positive electrode slurry (solid content of 17 wt %). A 20 μm thick positive electrode current collector (Al thin film) was coated with the positive electrode slurry, dried, and roll-pressed to manufacture a positive electrode.

Next, a mixture in which graphite and SiO are mixed in a weight ratio of 95:5 (graphite:SiO), as a negative electrode active electrode, Super-P as a conductive material, and a mixture in which styrene-butadiene rubber (SBR) and carboxymethylcellulose (CMC) are mixed in a weight ratio of 7:3 (SBR:CMC), as a binder, were added to N-methyl-2-pyrrolidone (NMP) at a weight ratio of 97:1:2 to prepare negative electrode slurry (solid content of 25 wt %). A 20 μm thick negative electrode current collector (Cu thin film) was coated with the negative electrode slurry, dried, and roll-pressed to manufacture a negative electrode.

Next, a pouch-type battery (2 Ah) was manufacture by a conventional method in which the manufacture positive electrode and negative electrode are sequentially laminated together with a polyethylene porous film, and then the above-prepared non-aqueous electrolyte solution was injected to manufacture a lithium secondary battery.

Example 2

A lithium secondary battery was manufactured in the same manner as in Example 1 except that a non-aqueous electrolyte solution was prepared by adding 2 g of vinylene carbonate (VC) and 1 g of propane sultone (PS) to 97 g of a non-aqueous organic solvent (a solvent mixture in which ethylene carbonate:dimethyl carbonate were mixed in a volume ratio of 1:9) in which 0.6 M $LiPF_6$ and 1.4 M lithium bis(fluorosulfonyl)imide were dissolved.

Example 3

A lithium secondary battery was manufactured in the same manner as in Example 1 except that a non-aqueous electrolyte solution was prepared by adding 2 g of vinylene carbonate (VC) and 1 g of propane sultone (PS) to 97 g of a non-aqueous organic solvent (a solvent mixture in which ethylene carbonate:dimethyl carbonate were mixed in a volume ratio of 1:9) in which 0.5 M $LiPF_6$ and 1.5 M lithium bis(fluorosulfonyl)imide were dissolved.

Example 4

A lithium secondary battery was manufactured in the same manner as in Example 1 except that a non-aqueous electrolyte solution was prepared by adding 2 g of vinylene carbonate (VC) and 1 g of propane sultone (PS) to 97 g of a non-aqueous organic solvent (a solvent mixture in which ethylene carbonate:dimethyl carbonate were mixed in a volume ratio of 1:9) in which 1 M $LiPF_6$ and 1.5 M lithium bis(fluorosulfonyl)imide were dissolved.

Example 5

A lithium secondary battery was manufactured in the same manner as in Example 1 except that a non-aqueous electrolyte solution was prepared by adding 2 g of vinylene carbonate (VC) and 1 g of propane sultone (PS) to 97 g of a non-aqueous organic solvent (a solvent mixture in which ethylene carbonate:dimethyl carbonate were mixed in a volume ratio of 1:9) in which 2 M $LiPF_6$ and 2 M lithium bis(fluorosulfonyl)imide were dissolved.

Comparative Example 1

A lithium secondary battery was manufactured in the same manner as in Example 1 except that a non-aqueous electrolyte solution was prepared by adding 2 g of vinylene carbonate (VC) and 1 g of propane sultone (PS) to 97 g of a non-aqueous organic solvent (a solvent mixture in which ethylene carbonate:dimethyl carbonate were mixed in a volume ratio of 3:7) in which 0.5 M $LiPF_6$ and 0.7 M lithium bis(fluorosulfonyl)imide were dissolved.

Comparative Example 2

A non-aqueous electrolyte solution was prepared by adding 2 g of vinylene carbonate (VC) and 1 g of propane sultone (PS) to 97 g of a non-aqueous organic solvent (a solvent mixture in which ethylene carbonate:dimethyl carbonate were mixed in a volume ratio of 1:9) in which 3 M $LiPF_6$ and 3 M lithium bis(fluorosulfonyl)imide were dissolved, but the prepared non-aqueous electrolyte was not applicable to a battery since a lithium salt was not completely dissolved.

Comparative Example 3

A lithium secondary battery was manufactured in the same manner as in Example 1 except that a non-aqueous electrolyte solution was prepared by adding 2 g of vinylene carbonate (VC) and 1 g of propane sultone (PS) to 97 g of a non-aqueous organic solvent (a solvent mixture in which ethylene carbonate:dimethyl carbonate were mixed in a volume ratio of 1:9) in which 2 M $LiPF_6$ was dissolved.

Comparative Example 4

A lithium secondary battery was manufactured in the same manner as in Example 1 except that a non-aqueous electrolyte solution was prepared by adding 2 g of vinylene carbonate (VC) and 1 g of propane sultone (PS) to 97 g of a non-aqueous organic solvent (a solvent mixture in which ethylene carbonate:dimethyl carbonate were mixed in a volume ratio of 1:9) in which 2 M lithium bis(fluorosulfonyl)imide was dissolved.

Comparative Example 5

A lithium secondary battery was manufactured in the same manner as in Example 1 except that $LiNi_{0.6}Co_{0.2}Mn_{0.2}O_2$ (NCM622) was used as a positive electrode active material instead of the $LiNi_{0.8}Co_{0.1}Mn_{0.1}O_2$.

Comparative Example 6

A lithium secondary battery was manufactured in the same manner as in Example 1 except that $LiNi_{0.6}Co_{0.2}Mn_{0.2}O_2$ was used as a positive electrode active material instead of the $LiNi_{0.8}Co_{0.1}Mn_{0.1}O_2$.

Comparative Example 7

A lithium secondary battery was manufactured in the same manner as in Example 1 except that $LiCoO_2$ (LCO) was used as a positive electrode active material instead of the $LiNi_{0.8}Co_{0.1}Mn_{0.1}O_2$, and only a graphite was used as a negative electrode active material instead of the mixture of graphite and SiO.

Comparative Example 8

A lithium secondary battery was manufactured in the same manner as in Example 1 except that $LiCoO_2$ was used as a positive electrode active material instead of the $LiNi_{0.8}Co_{0.1}Mn_{0.1}O_2$, and only a graphite was used as a negative electrode active material instead of the mixture of graphite and SiO.

Comparative Example 9

A lithium secondary battery was manufactured in the same manner as in Example 1 except that only a graphite was used as a negative electrode active material instead of the mixture of graphite and SiO.

TABLE 1

| | $LiPF_6$ Concen-traion [M] | LiFSI Concen-traion [M] | Solvent (volume ratio) | Positive electrode active material | Negative electrode active material (weight ratio) |
|---|---|---|---|---|---|
| Example 1 | 1 | 1 | EC/DMC (1/9) | NCM811 | Graphite/SiO (95/5) |
| Example 2 | 0.6 | 1.4 | EC/DMC (1/9) | NCM811 | Graphite/SiO (95/5) |
| Example 3 | 0.5 | 1.5 | EC/DMC (1/9) | NCM811 | Graphite/SiO (95/5) |
| Example 4 | 1 | 1.5 | EC/DMC (1/9) | NCM811 | Graphite/SiO (95/5) |
| Example 5 | 2 | 2 | EC/DMC (1/9) | NCM811 | Graphite/SiO (95/5) |
| Comparative Example 1 | 0.5 | 0.7 | EC/DMC (3/7) | NCM811 | Graphite/SiO (95/5) |
| Comparative Example 2 | 3 | 3 | EC/DMC (1/9) | — | — |
| Comparative Example 3 | 2 | — | EC/DMC (1/9) | NCM811 | Graphite/SiO (95/5) |
| Comparative Example 4 | — | 2 | EC/DMC (1/9) | NCM811 | Graphite/SiO (95/5) |
| Comparative Example 5 | 1 | 1 | EC/DMC (1/9) | NCM622 | Graphite/SiO (95/5) |
| Comparative Example 6 | 0.5 | 0.7 | EC/DMC (3/7) | NCM622 | Graphite/SiO (95/5) |
| Comparative Example 7 | 1 | 1 | EC/DMC (1/9) | LCO | Graphite (100) |
| Comparative Example 8 | 0.5 | 0.7 | EC/DMC (3/7) | LCO | Graphite (100) |
| Comparative Example 9 | 1 | 1 | EC/DMC (1/9) | NCM811 | Graphite (100) |

Experimental Example 1: Evaluation of Life at a Room-Temperature

With respect to lithium secondary batteries manufactured in Examples and Comparative Example 1, a formation was performed with a current of 200 mA (0.1 C rate), and then 100 cycles of charging at a CC-CV of 4.2 V, 666 mA (0.33 C, 0.05 C cut-off), and discharging at a CC of 3 V, 666 mA (0.33 C) were performed. Then, when a discharge capacity in the first cycle was set to be 100%, the ratio of the 100th discharge capacity was measured as the capacity retention rate, and the results thereof are presented in table 2 below.

TABLE 2

| | capacity retention rate % |
|---|---|
| Example 1 | 95 |
| Example 2 | 94 |
| Example 3 | 98 |
| Example 4 | 94 |
| Example 5 | 96 |
| Comparative Example 1 | 90 |

TABLE 2-continued

| | capacity retention rate % |
|---|---|
| Comparative Example 3 | 88 |
| Comparative Example 4 | 92 |
| Comparative Example 5 | 84 |
| Comparative Example 6 | 85 |
| Comparative Example 7 | 90 |
| Comparative Example 8 | 90 |
| Comparative Example 9 | 89 |

Through Table 2 above, it can be confirmed that the secondary batteries manufactured according to Examples 1 and of the present invention have excellent lifetime characteristics compared to the secondary batteries manufactured according to Comparative Examples 1 to 9.

Experimental Example 2: Measurement of Initial DC-Resistance

With respect to each of the lithium secondary batteries manufactured in Examples 1-5 and Comparative Examples 1, 3, 4 and 9, a formation was performed with a current of 200 mA (0.1 C rate), and then 3 cycles of charging at a CC-CV of 4.2 V, 666 mA (0.33 C, 0.05 C cut-off), and discharging at a CC of 3 V, 666 mA (0.33 C) were repeated. Subsequently, voltage drop was recorded, and DC-resistance values calculated using R=V/I (Ohm's law) are presented in table 3 below.

TABLE 3

| | Initial resistance [Ohm] |
|---|---|
| Example 1 | 0.038 |
| Example 2 | 0.041 |
| Example 3 | 0.035 |
| Example 4 | 0.040 |
| Example 5 | 0.043 |
| Comparative Example 1 | 0.05 |
| Comparative Example 3 | 0.062 |
| Comparative Example 4 | 0.058 |
| Comparative Example 9 | 0.05 |

As shown in [Table 3] above, the secondary batteries in Examples 1-5 exhibit low initial resistances compared to the secondary batteries in Comparative Examples in 1, 3, 4, and 9. This result exhibits that the secondary batteries in Examples 1-5 are stable in electrode and electrolyte interface characteristics, and have superior lithium ion mobility compared to the secondary batteries in Comparative Examples 1, 3, 4, and 9.

When a lithium concentration is low as in Comparative Example 1, forming an SEI film is difficult and a lithium ion mobility is degraded so that the initial resistance increases.

When $LiPF_6$ is applied solely as in Comparative Example 3, lithium ion mobility is superior, but forming a stable SEI film on the surface of a negative electrode (in particular, a silicon active material) is difficult so that the resistance increases, and when LiFSI is applied solely as in Comparative Example 4, an SEI film is stable but lithium ion mobility decreases, as in Comparative Example 3, so that the initial resistance of the battery increases.

Experimental Example 3: Evaluation of High-Temperature Safety

With respect to each of the secondary batteries manufactured in Example 1-5, and Comparative Example 1 and 3, a HOT box test (an experiment in which SOC 100% full charged lithium secondary of battery was heated up to 150° C. at a heating rate of 5° C./min and left for 4 hours to check whether ignition occurs or not) which is an evaluation index to confirm high-temperature durability, was performed. The measurement results are presented in Table 4 below.

Figure 2:
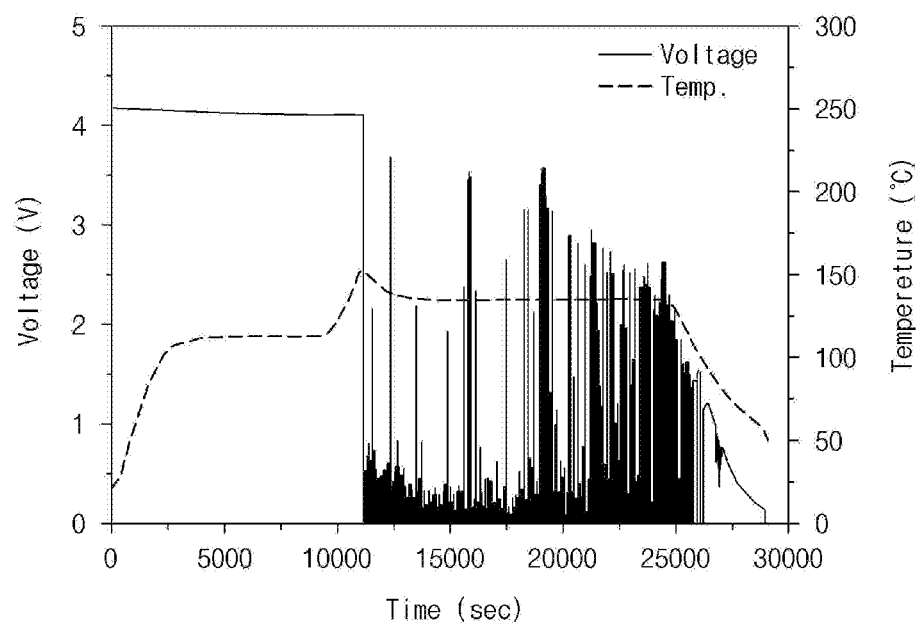
FIG. 2 is a graph showing temperature and voltage changes with time when a lithium secondary battery manufactured according to Comparative Example 3 of the present invention was HOT box tested.

In addition, the changes in voltage and temperature with time of Example 1 and Comparative Example 3 upon HOT box testing are presented in FIG. 1 and FIG. 2. FIG. 1 is a graph showing HOT box test results of Example 1, and FIG. 2 is a graph showing HOT box test results of Comparative Example 3.

TABLE 4

|  | Ignite or not | Ignition start time (minute) |
|---|---|---|
| Example 1 | X | — |
| Example 2 | X | — |
| Example 3 | X | — |
| Example 4 | X | — |
| Example 5 | X | — |
| Comparative Example 1 | O | 10 |
| Comparative Example 3 | X | — |

In Table 4, X represents cases in which ignition does not occur during storage at 150° C., and O represents cases in which ignition occurs during high-temperature storage.

Reviewing Table 4, the lithium secondary batteries of Examples 1-5 do not ignite at all during high-temperature storage even in a fully charged state. This is understood to mean that since an electrode interface stability of the lithium secondary batteries of Examples 1-5 is excellent, an exothermic reaction is reduced and thermal runaway of the lithium secondary batteries is suppressed.

In contrast, it can be observed that ignition of the lithium secondary battery of Comparative Example 1 occurs during storage at 150° C. A positive electrode in a charged state is in a state in which lithium ions are deintercalated. Accordingly, when the positive electrode is exposed to a high temperature, a structure of the positive electrode collapses and oxygen radicals are generated. The oxygen radicals generated thus exothermically react with an electrolyte in the secondary battery so that heat is accumulated inside the battery, thereby causing thermal shrinkage of a separator and causing an internal short circuit of the secondary battery to thus accompany a rapid thermal runaway phenomenon, and thus the battery ignites. Therefore, since the lithium secondary battery of Comparative Example 1 in which an interfacial adhesion between an electrode and an electrolyte is not improved has relatively weak high-temperature stability, it can be observed that ignition occurs during storage at 150° C.

Meanwhile, in the case of Comparative Example 3, ignition does not occur. However, as shown in FIG. 2, in the case of the lithium secondary battery of Comparative Example 3, rapid voltage drop occurs at around 150° C. In comparison, as shown in FIG. 1, it can be observed that the voltage of the lithium secondary battery of Example 1 is kept relatively constant during the HOT box test.

The invention claimed is:

1. A lithium secondary battery comprising:
a positive electrode having a positive electrode active material represented by the following Formula 1;
a negative electrode having a silicon-based negative electrode active material and a carbon-based negative electrode active material, wherein the silicon-based negative electrode active material and the carbon-based negative electrode active material are present in a weight ratio between 1:99 and 50:50;
a separator; and
a non-aqueous electrolyte solution,
wherein the non-aqueous electrolyte solution having a non-aqueous organic solvent and a lithium salt,
wherein the lithium salt is present in a concentration of 2.5 M to 5 M in the non-aqueous electrode solution, and
wherein the lithium salt comprising $LiPF_6$, and a lithium bis(fluorosulfonyl)imide, wherein $LiPF_6$ and the lithium bis(fluorosulfonyl)imide are present in a weight ratio between 1:9 and 5:5;

$$Li_{1+x}[Ni_aCo_bMn_cM_d]O_2 \quad \text{[Formula 1]}$$

wherein, $0<x<1$, $0.8<a<1$, $0<b<0.2$, $0<c<0.2$, $0<d<0.2$, and M is at least one element selected from the group consisting of W, Cu, Fe, V, Cr, Ti, Zr, Zn, Al, Ta, Y, In, La, Sr, Ga, Sc, Gd, Sm, Ca, Ce, Nb, Mg, B, and Mo.

2. The lithium secondary battery of claim 1,
wherein the lithium salt is present in a concentration of 4 M to 5 M in the non-aqueous electrolyte solution.

3. The lithium secondary battery of claim 1,
wherein $LiPF_6$ and the lithium bis(fluorosulfonyl)imide are present in a weight ratio between 2:8 and 5:5.

4. The lithium secondary battery of claim 1,
wherein the silicon-based negative electrode active material comprises at least one selected from the group consisting of a metal silicon (Si), a silicon oxide ($SiO_y$), where $0<y<2$, a silicon carbide (SiC) and an Si—Y alloy, where Y is an element selected from the group consisting of an alkali metal, an alkaline earth metal, a Group 13 element, a Group 14 element, a transition metal, a rare earth metal, and a combination thereof, and wherein Y excludes Si.

5. The lithium secondary battery of claim 1,
wherein the non-aqueous organic solvent comprises at least one selected from the group consisting of a cyclic carbonate-based solvent, a linear carbonate-based solvent, an ester-based solvent, and an ether-based solvent, wherein, when the non-aqueous organic solvent includes a cyclic carbonate-based solvent, the cyclic carbonate-base solvent is present at 20 vol % or less relative to the total volume of the non-aqueous organic solvent.

6. The lithium secondary battery of claim 5,
wherein the non-aqueous organic solvent comprises the cyclic carbonate-based solvent.

* * * * *